US009208408B2

(12) United States Patent
Fujimoto

(10) Patent No.: US 9,208,408 B2
(45) Date of Patent: Dec. 8, 2015

(54) PRINTING APPARATUS AND CORRECTION METHOD OF THE PRINTING APPARATUS

(71) Applicant: CANON KABUSHIKI KAISHA, Tokyo (JP)

(72) Inventor: Kazushi Fujimoto, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/214,378

(22) Filed: Mar. 14, 2014

(65) Prior Publication Data

US 2014/0300908 A1 Oct. 9, 2014

(30) Foreign Application Priority Data

Apr. 3, 2013 (JP) ................................ 2013-078095

(51) Int. Cl.
*G06K 15/00* (2006.01)
*H04N 1/047* (2006.01)
*H04N 1/407* (2006.01)
*H04N 1/12* (2006.01)
*H04N 1/191* (2006.01)

(52) U.S. Cl.
CPC .............. *G06K 15/00* (2013.01); *H04N 1/0473* (2013.01); *H04N 1/407* (2013.01); *H04N 1/12* (2013.01); *H04N 1/1911* (2013.01); *H04N 2201/0471* (2013.01)

(58) Field of Classification Search
CPC .......... H04N 1/40018; H04N 1/40075; H04N 1/40081; H04N 1/40087; H04N 1/40093
USPC ................................. 358/1.1–3.29, 1.11–1.18
See application file for complete search history.

(56) References Cited

U.S. PATENT DOCUMENTS

| 6,822,414 | B2 | 11/2004 | Morita et al. | |
|---|---|---|---|---|
| 7,123,390 | B2* | 10/2006 | Sato | 358/505 |
| 8,724,180 | B2* | 5/2014 | Okada | 358/445 |
| 2013/0108292 | A1* | 5/2013 | Suzuki et al. | 399/49 |

FOREIGN PATENT DOCUMENTS

| JP | 2002-199768 A | 7/2002 |
|---|---|---|
| JP | 2007-107886 A | 4/2007 |

\* cited by examiner

*Primary Examiner* — Marcellus Augustin
(74) *Attorney, Agent, or Firm* — Fitzpatrick, Cella, Harper & Scinto

(57) ABSTRACT

In an apparatus including a first acquisition unit configured to acquire information of an operation amount of a conveyance unit configured to convey a printing medium, a second acquisition unit configured to acquire information of a density of an image printed by a printhead, and a specify unit configured to specify the density of the image based on histogram collection on the information of the density of the image acquired by the second acquisition, the following correction is made. More specifically, a correction value of the information of the operation amount based on a histogram on the acquired information of the operation amount is decided. Then, based on the decided correction value, the acquired information of the operation amount is corrected.

18 Claims, 8 Drawing Sheets

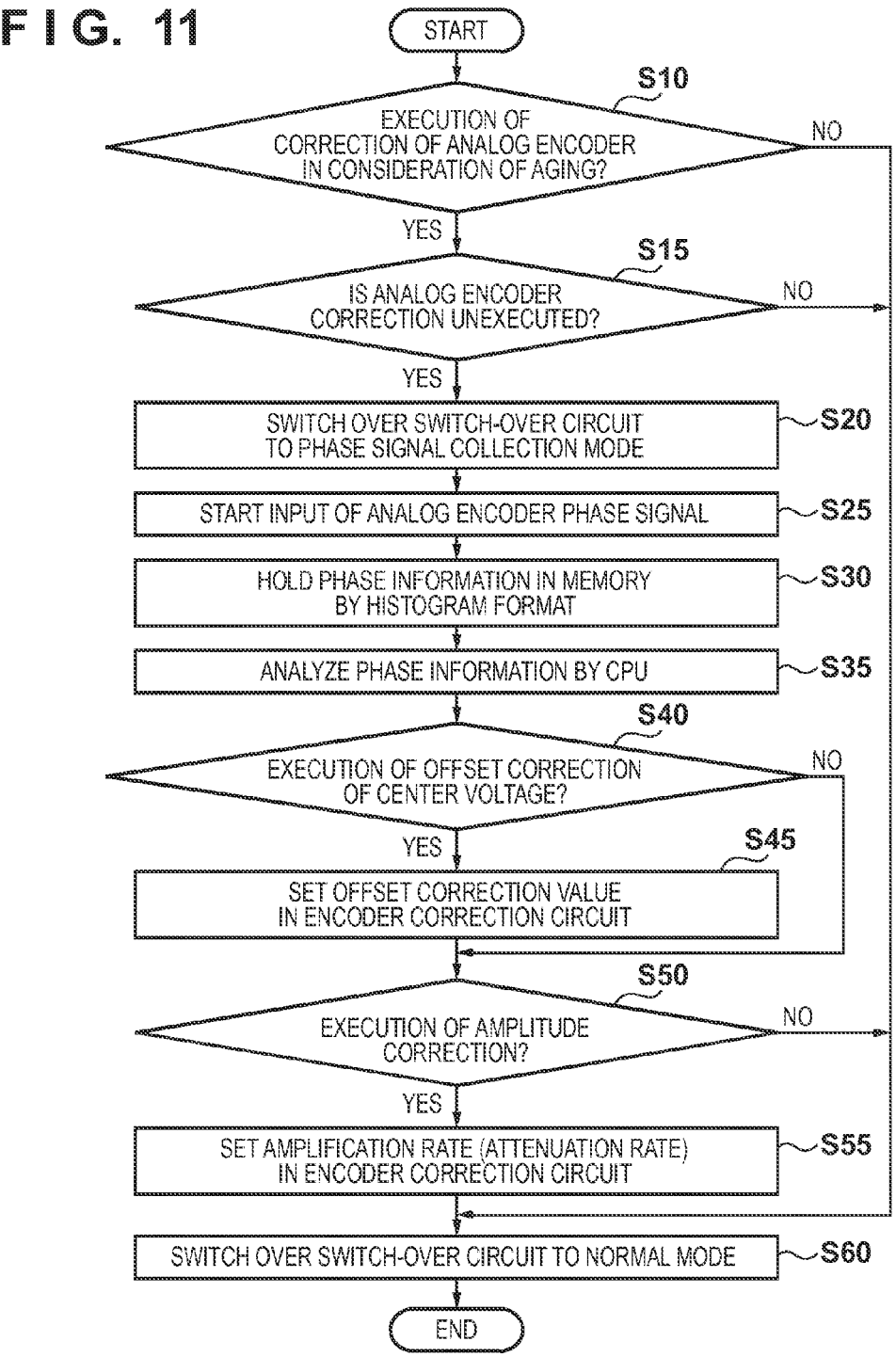

PRINTING APPARATUS AND CORRECTION METHOD OF THE PRINTING APPARATUS

BACKGROUND OF THE INVENTION

1. Field of the Invention

The present invention relates to an apparatus and a method of the apparatus and, particularly to, for example, a printing apparatus that corrects a signal from an analog encoder sensor used for conveyance control of a printing paper sheet and a correction method of the printing apparatus.

2. Description of the Related Art

As an information output apparatus for, for example, a word processor, a personal computer, a facsimile apparatus, and the like, a printer that prints any desired information such as characters and images on a sheet-like printing medium such as a paper sheet or a film is widely used.

Various methods are known as the printing method for the printer. An inkjet method has particularly received a great deal of attention because of its quietness and capability of noncontact printing on a printing medium such as a paper sheet and facilitating color printing. Especially, a serial inkjet printing apparatus for performing printing while reciprocally scanning a printhead that discharges ink in accordance with a print instruction in a direction crossing the printing medium conveyance direction is widely used in general because it is inexpensive and facilitates size reduction.

Such an inkjet printing apparatus (to be referred to as a printing apparatus hereinafter) implements image printing of higher resolution by decreasing the ink discharge amount per dot while raising the integration density of nozzles for discharging ink droplets. For higher quality printing, a printing technique using not only four basic color inks (cyan, magenta, yellow, and black) but also light inks of lower dye densities or spot inks such as red, green, and blue inks is used.

There is a fear that the printing speed lowers as the printing quality becomes high. This problem is dealt with by increasing the printing paper sheet conveyance speed by, for example, increasing the number of printing elements mounted on a printhead, improving the driving frequency of printing elements, and employing reciprocal printhead scanning.

For the purpose of simultaneously attaining a high printing medium conveyance speed and a high conveyance accuracy in a printing apparatus, recently, an encoder that outputs analog feedback signals of A- and B-phase sine waves having a phase difference of 90° is used in a detector for detecting the position and speed of a conveyance motor. In these analog feedback signals of sine waves, an offset representing a shift of an amplitude center voltage from a set value, or their amplitudes and phase difference vary. For this reason, conventionally, analog feedback signals are observed using special measurement equipment such as an oscilloscope, information on the offset, amplitudes, and phase difference are obtained, and the analog feedback signals are adjusted. Alternatively, a dedicated calculation circuit or memory is prepared, and correction is done in the circuit.

For example, according to Japanese Patent Laid-Open No. 2007-107886, a position error signal waveform and an A-phase signal waveform are measured by an encoder analysis device. An encoder error included in two analog encoder sensor signals, that is, an A-phase encoder signal and a B-phase encoder signal is calculated and stored in a non-volatile memory. On the other hand, a correction circuit reads out the encoder error from the non-volatile memory, and corrects the A-phase encoder signal and the B-phase encoder signal.

In addition, according to Japanese Patent Laid-Open No. 2002-199768, a detection circuit A/D-converts analog feedback signals from an encoder. A calculation unit obtains the offset between the A- and B-phase analog feedback signals and their amplitudes and phase difference based on the converted digital signals. The obtained offset, amplitudes, and phase difference are displayed on the display unit of a motor control unit or the display device of a numerical controller that is the host apparatus of the control unit. In addition, the quality of the feedback signals from the encoder is discriminated by comparing the obtained offset and amplitudes with reference values.

In both of Japanese Patent Laid-Open Nos. 2007-107886 and 2002-199768, however, a dedicated memory and a dedicated circuit that collects and analyzes encoder signals are needed to decide the parameters for correction. This leads to an increase in the circuit scale and an increase in the cost of the entire apparatus.

SUMMARY OF THE INVENTION

Accordingly, the present invention is conceived as a response to the above-described disadvantages of the conventional art.

For example, an apparatus and a method thereof according to this invention are capable of collecting and analyzing encoder signals by a simple inexpensive arrangement.

According to one aspect of the present invention, there is provided an apparatus. The apparatus comprises: a first acquisition unit configured to acquire information of an operation amount of a conveyance unit configured to convey a printing medium; a second acquisition unit configured to acquire information of a density of an image printed by a printhead; a correction unit configured to correct the information of the operation amount acquired by the first acquisition unit; and a specify unit configured to specify the density of the image based on histogram collection on the information of the density of the image acquired by the second acquisition unit. Note that the specify unit creates a histogram on the information of the operation amount acquired by the first acquisition unit, and decides a correction value of the information of the operation amount based on the created histogram, and the correction unit performs correction based on the correction value decided by the specify unit.

According to another aspect of the present invention, there is provided a method of an apparatus including a first acquisition unit configured to acquire information of an operation amount of a conveyance unit configured to convey a printing medium, a second acquisition unit configured to acquire information of a density of an image printed by a printhead, and a specify unit configured to specify the density of the image based on histogram collection on the information of the density of the image acquired by the second acquisition unit. The method comprises: deciding a correction value of the information of the operation amount based on a histogram on the information of the operation amount acquired by the first acquisition unit; and correcting the information of the operation amount acquired by the first acquisition unit based on the decided correction value.

The invention is particularly advantageous since, for example, histogram collection and storage of phase signals of an analog encoder sensor can be performed using an information holding unit originally provided for another purpose. It is therefore possible to suppress an increase in the cost of the entire apparatus without the necessity of providing a dedicated capturing circuit or memory used to detect a phase signal of a dedicated analog encoder sensor.

Further features of the present invention will become apparent from the following description of exemplary embodiments (with reference to the attached drawings).

BRIEF DESCRIPTION OF THE DRAWINGS

FIG. 11 is a flowchart showing the correction operation of the analog encoder.

DESCRIPTION OF THE EMBODIMENTS

Figure 1:
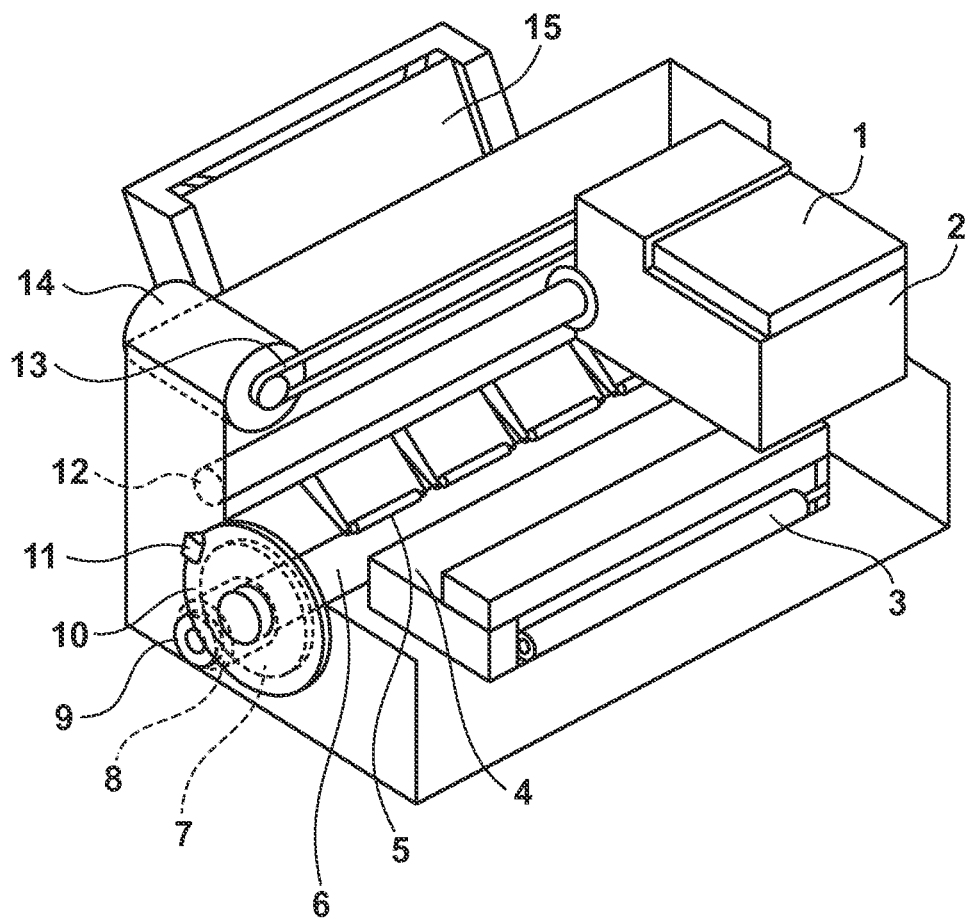
FIG. 1 is a perspective view showing the outer appearance of an inkjet printing apparatus according to an exemplary embodiment of the present invention.

Exemplary embodiments of the present invention will now be described in detail in accordance with the accompanying drawings. Note that the same reference numerals denote already explained parts, and a repetitive description thereof will be omitted.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "nozzle" generically means an ink orifice or a liquid channel communicating with it, and an element for generating energy used to discharge ink, unless otherwise specified.

FIG. 1 is a perspective view showing the outer appearance of a printing apparatus that performs printing using an inkjet printhead (to be referred to as a printhead hereinafter) according to an exemplary embodiment of the present invention.

As shown in FIG. 1, a carriage 2, on which a printhead 1 including a nozzle array formed from a plurality of nozzles for discharging ink is mounted, reciprocally moves along a shaft 12 on which it is fixed in a scanning direction perpendicular to the conveyance direction of a printing medium 15 such as a printing paper sheet. The carriage 2 moves as the rotating force of a carriage motor 14 is transmitted to it via a belt 13.

The printing apparatus includes a discharge roller 3 used to discharge a printed printing medium out of the apparatus, a platen 4 located under the printed surface, and paper hold rollers 5 used to hold the printing medium 15.

A conveyance motor 8 rotates a conveyance roller 6 via a conveyance gear 7 and a conveyance motor gear 9 and conveys the printing medium 15. An encoder film 10 rotates in synchronism with the rotation of the conveyance motor 8. A slit formed in the encoder film 10 is detected using an analog encoder sensor 11. An encoder signal output from the analog encoder sensor 11 at this time is used to detect the rotation position of the conveyance motor 8 and generate a printing timing.

Figure 2:
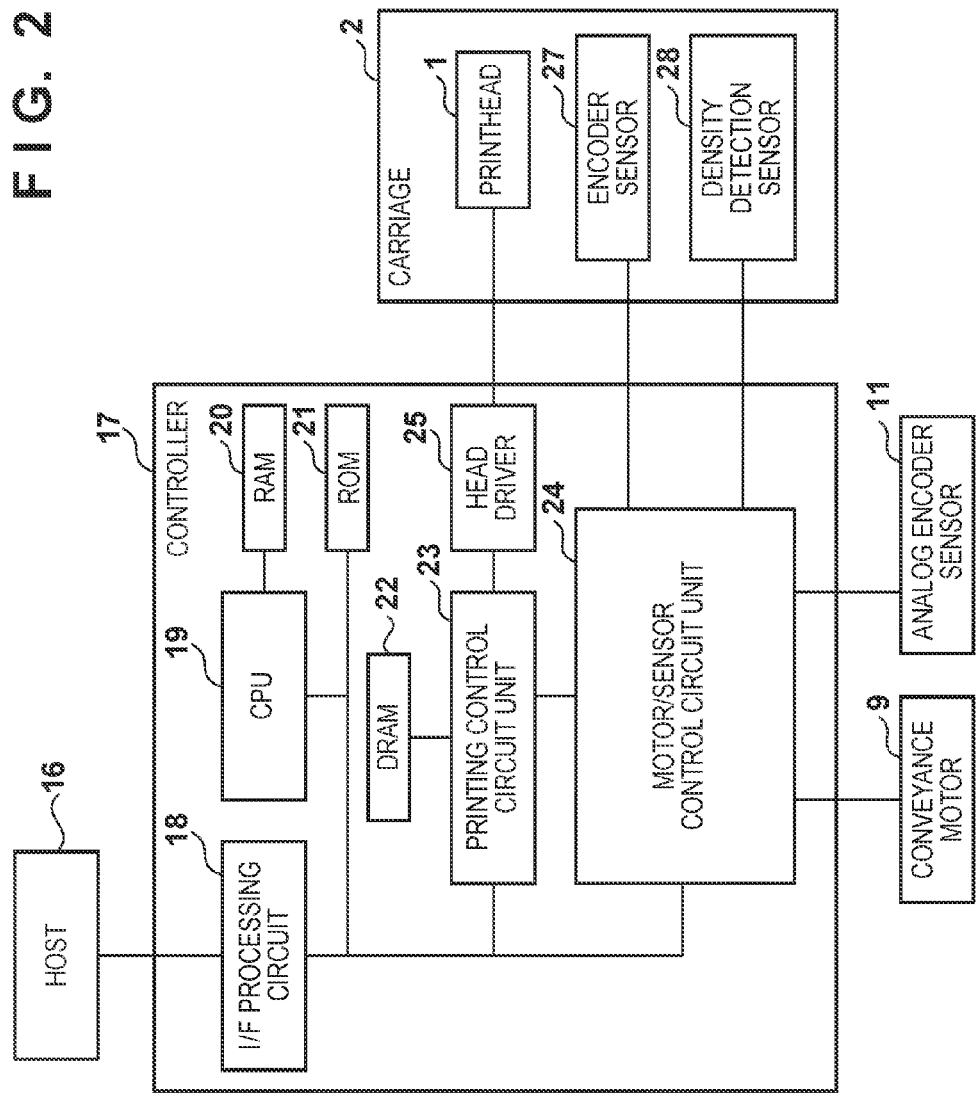
FIG. 2 is a block diagram showing the control arrangement of the printing apparatus shown in FIG. 1.

FIG. 2 is a block diagram showing the control arrangement of the printing apparatus shown in FIG. 1.

A control command or print data transmitted from a host 16 is received by an I/F processing circuit 18 provided in a controller 17. The received control command is analyzed by a CPU 19, and the printing apparatus is controlled in accordance with the control command. Note that a ROM 21 stores programs used by the CPU 19 to operate and various kinds of tables necessary to control a printing control circuit unit 23.

The received print data is transferred to the printing control circuit unit 23 and stored in a DRAM 22 having a large capacity after having undergone various kinds of image processing according to the printing method. The DRAM 22 stores print data used to perform printing of at least one scanning by the printhead 1. The DRAM 22 also stores an image mask and the like used to perform multipass printing or distribute print data to two nozzles.

When a print start instruction from the CPU 19 is executed, the printing control circuit unit 23 generates a printing timing from a detection value of an encoder sensor 27 mounted on the carriage 2, and print data stored in the DRAM 22 is read out based on the printing timing. After that the readout print data is transmitted to the printhead 1 via a head driver 25, and a printing operation is thus performed.

Figure 3:
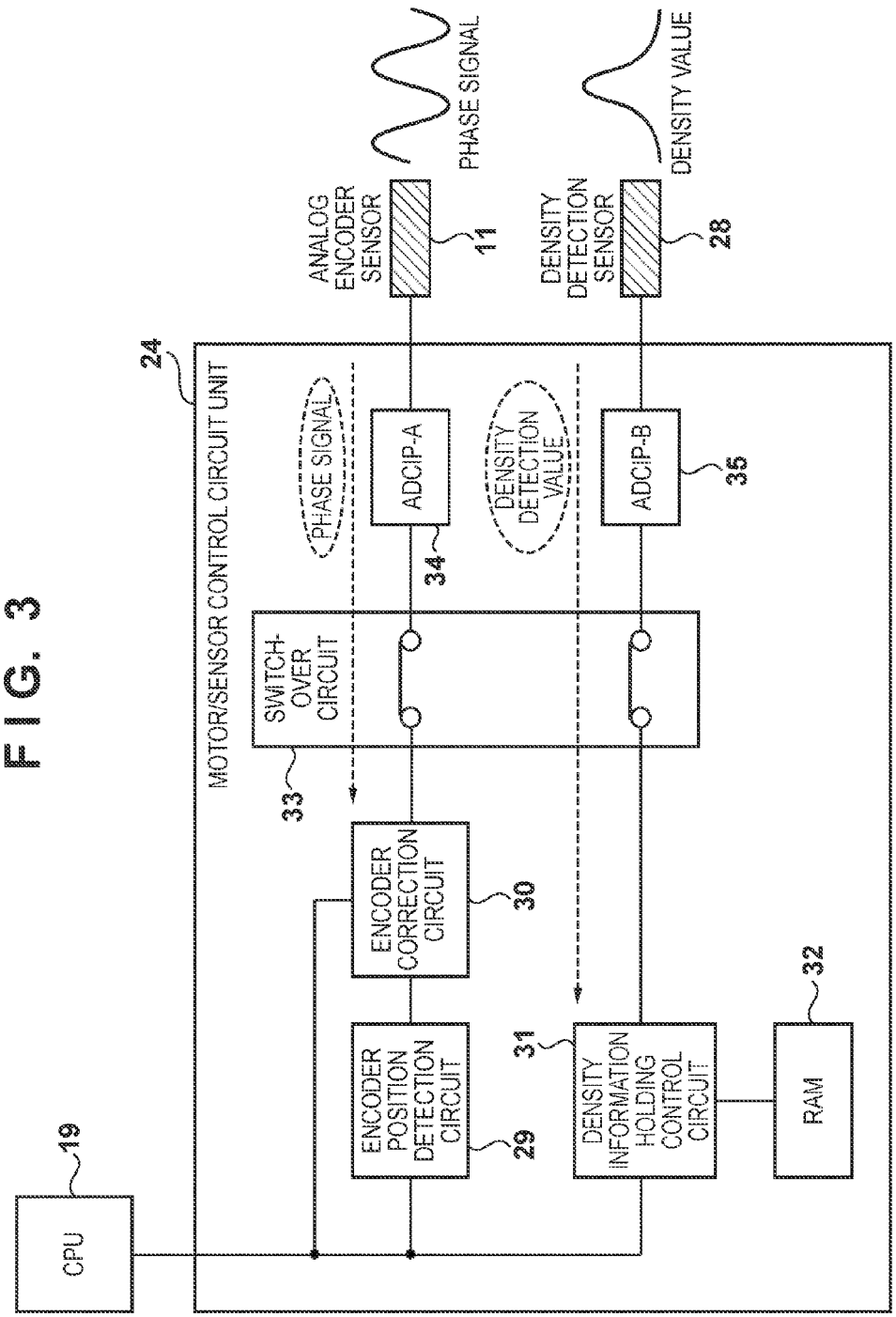
FIG. 3 is a block diagram showing the detailed arrangement of a motor/sensor control circuit unit 24 in a normal mode.
Figure 4:
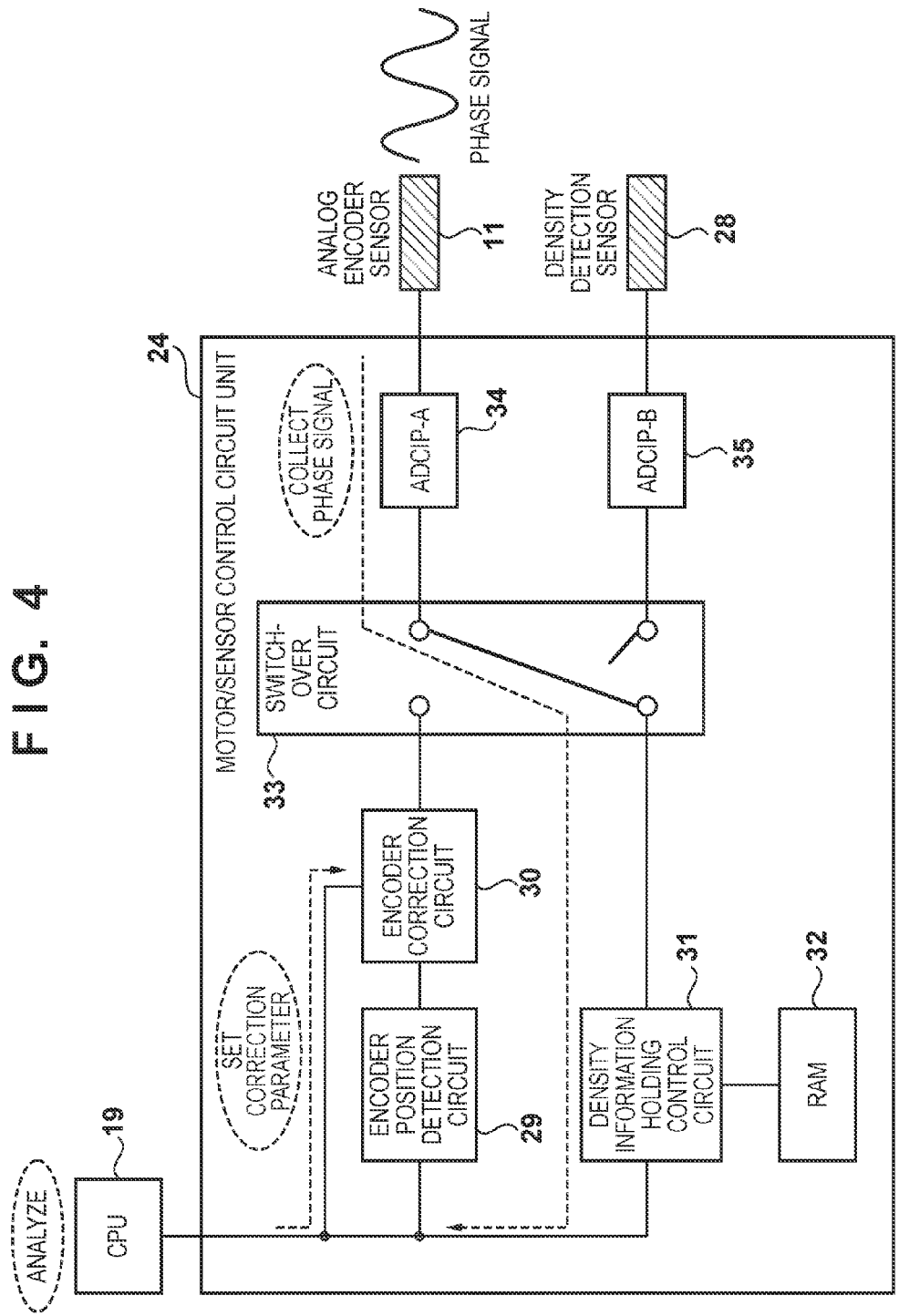
FIG. 4 is a block diagram showing the detailed arrangement of the motor/sensor control circuit unit 24 in a phase signal collection mode.

As for a printed image, even when the same color should be printed, it may be impossible to obtain an image of the same density because of aging or a variation in the ink discharge amount from the printhead 1. To cope with this problem, the density value of a printed image is read using a density detection sensor 28. The read value is analyzed by the CPU 19 and then used for so-called color calibration to correct the density value of print data. As described above, the printing apparatus performs first correction concerning the output of the encoder sensor 27 and second correction concerning the output of the density detection sensor 28. FIGS. 3 and 4 are block diagrams showing the detailed arrangement of a motor/sensor control circuit unit 24.

As described above, an encoder signal from the analog encoder sensor 11 is input to the motor/sensor control circuit unit 24 to detect the rotation position of the conveyance motor 8.

In addition, a density signal from the density detection sensor 28, which is obtained by reading the ink density of a printed image for density detection, is also input to the motor/sensor control circuit unit 24 for correction (so-called color calibration) of the density by a variation in the ink discharge amount from the printhead. The analog encoder sensor 11 is connected to a first analog/digital converter (ADCIP-A) 34, and the density detection sensor 28 is connected to a second analog/digital converter (ADCIP-B) 35. A first detection unit includes the analog encoder sensor 11 and the first analog/digital converter (ADCIP-A) 34, and detects the operation amount of the conveyance motor or conveyance roller. A second detection unit includes the density detection sensor 28 and the second analog/digital converter (ADCIP-B) 35, and detects the density of an image printed on the printing medium 15.

The motor/sensor control circuit unit 24 has two operation modes: a normal mode (second mode) and a phase signal collection mode (first mode) for deciding the correction value of the phase signal of the analog encoder sensor 11.

The normal mode will be described next with reference to FIG. 3.

In the normal mode, analog values output from the analog encoder sensor 11 and the density detection sensor 28 and input to the motor/sensor control circuit unit 24 are converted from the analog values to digital values by the two analog/digital converters 34 and 35, respectively. The converted digital values are input to an encoder correction circuit 30 configured to correct the phase signal from the encoder and a density information holding control circuit 31 capable of creating a histogram of input values, respectively, via a switch-over circuit 33. That is, the output destination of the phase signal from the encoder is the encoder correction circuit 30, and the output destination of the density signal is the density information holding control circuit 31.

For the phase signal input from the analog encoder sensor 11 to the encoder correction circuit 30, the offset of the center voltage, the amplitude/phase difference, and the like are corrected based on preset parameters. When the corrected signal is input to an encoder position detection circuit 29, the sheet position can accurately be detected with few errors.

On the other hand, the density value input to the density information holding control circuit 31 is collected by a histogram format and held in a RAM 32. The density value detected by the density detection sensor 28 is converted from an analog value to a digital value by the second analog/digital converter 35, and input to the density information holding control circuit 31 via the switch-over circuit 33. The density information holding control circuit 31 includes a low-pass filter used for removing noise from the detection value so as to correctly detect the density value of the printed image.

The density information holding control circuit 31 has not only an ordinary averaging function but also, for example, a truncated averaging function of averaging values after removing large and small values from the analog/digital-converted parent population. The data of detection values averaged using these functions is held in the RAM 32 with a histogram format. The density values held with the histogram format are analyzed by the CPU 19 and used as a basis for determining whether or not to perform color calibration.

The phase signal collection mode will be described next with reference to FIG. 4.

In the phase signal collection mode, the output of the first analog/digital converter 34 connected to the analog encoder sensor 11 is connected to the density information holding control circuit 31 by the switch-over circuit 33, and the output of the second analog/digital converter 35 connected to the density detection sensor 28 is disconnected. The phase signal from the analog encoder sensor 11, which is output from the first analog/digital converter 34 and input to the density information holding control circuit 31, is held in the RAM 32 by a histogram format using the functions of the density information holding control circuit 31, similar to the density value. That is, the output destination of the phase signal from the encoder is the density information holding control circuit 31, and the density information holding control circuit 31 as the output destination of the density signal is disconnected. In this way, information about the phase signal is held in the holding area for holding information about the density value.

However, in the phase signal collection mode, the density information holding control circuit 31 simply holds the information about the phase signal with the histogram format and need not use any other filter functions and the like, unlike the normal mode. The state of the held histogram of the phase signal from the analog encoder sensor 11 is analyzed by the CPU 19. This can reveal the states of the center voltage, offset, amplitude/phase difference, and the like of the phase signal from the analog encoder sensor 11. It is also possible to decide what kind of correction parameter should be given to the encoder correction circuit 30 for correction.

A specific correction method for an encoder signal from the analog encoder sensor 11 using the printing apparatus with the above-described arrangement will be described below.

Figure 5:
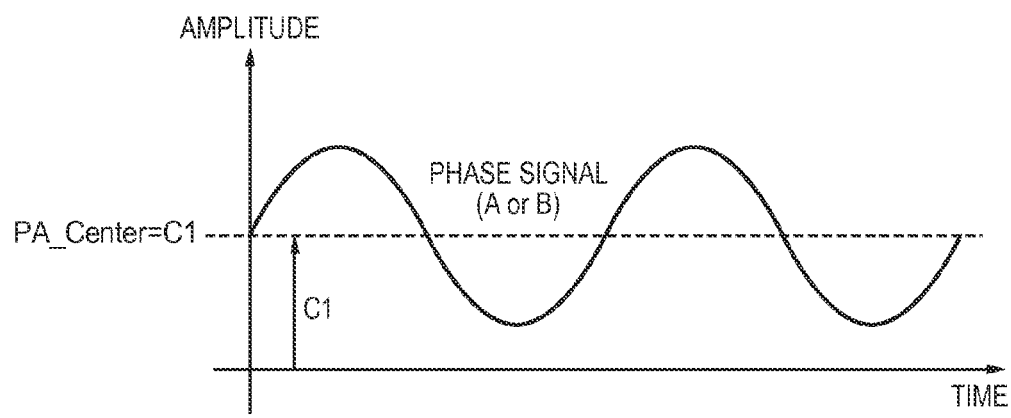
FIG. 5 is a timing chart showing the waveform of a phase signal input from an analog encoder sensor in a case where correction is unnecessary.
Figure 6:
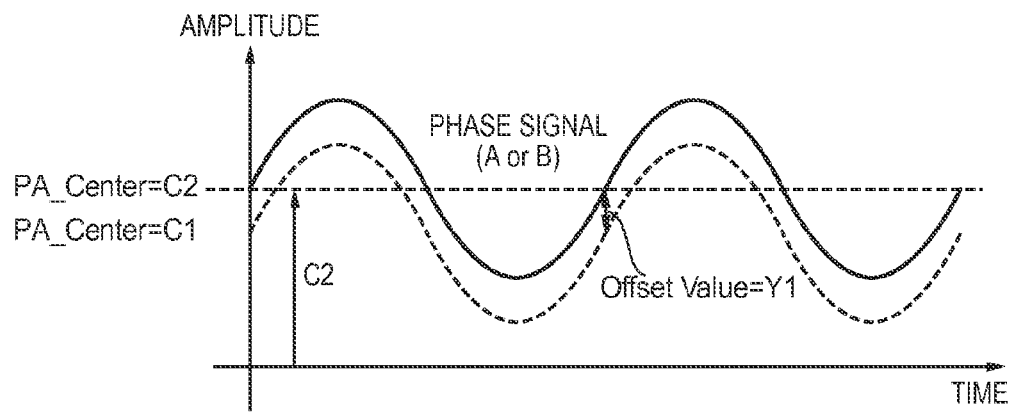
FIG. 6 is a timing chart showing a waveform in a case where an offset value Y1 is generated for the central value of an amplitude.

FIG. 5 is a timing chart showing the waveform of a phase signal input from the analog encoder sensor. The central value of the amplitude of this waveform is C1. On the other hand, FIG. 6 is a timing chart showing a waveform in a case where an offset value Y1 is generated for the central value of the amplitude. A central value C2 in this case is given by C2=C1+Y1.

Figure 7:
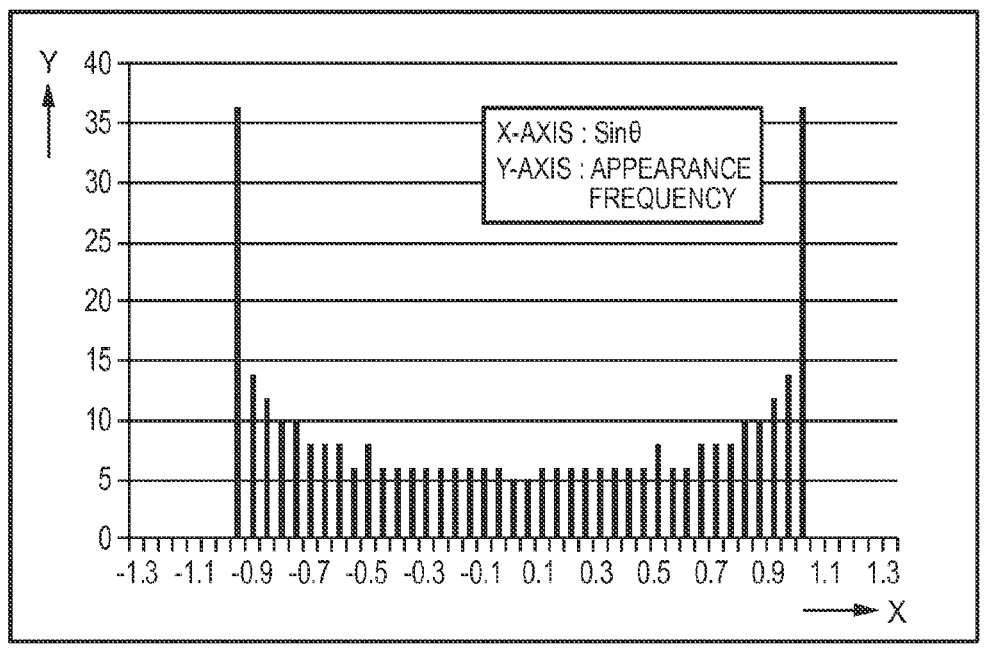
FIG. 7 is a view showing a result of capturing the input waveform shown in FIG. 5 by a histogram format in the phase signal collection mode.
Figure 8:
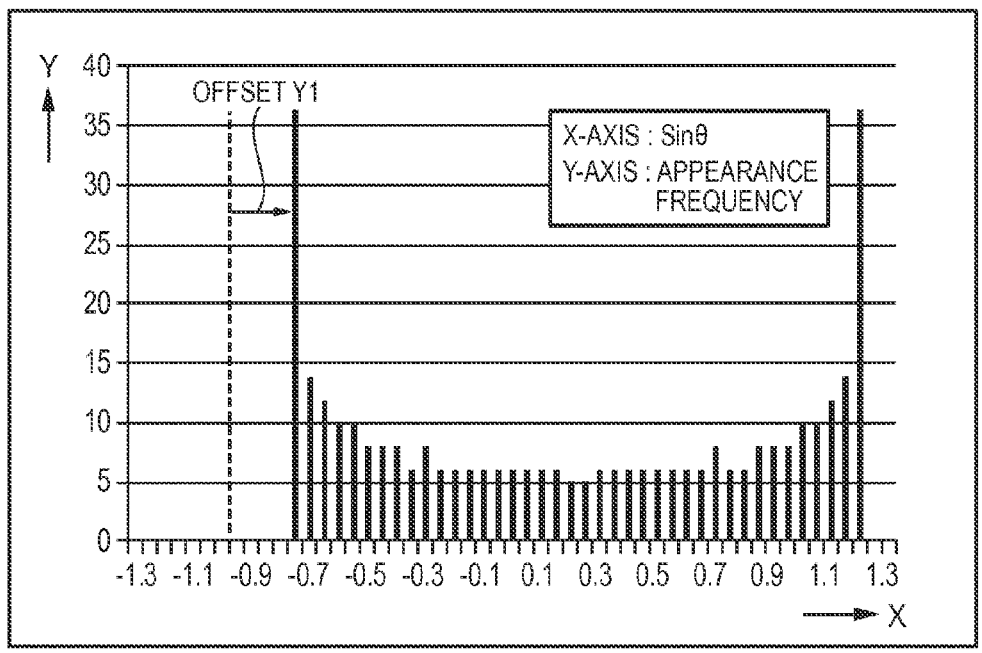
FIG. 8 is a view showing a result of capturing the input waveform shown in FIG. 6 by a histogram format in the phase signal collection mode.

FIGS. 7 and 8 are views showing results of capturing the input waveforms shown in FIGS. 5 and 6 by a histogram format in the phase signal collection mode, respectively. FIGS. 7 and 8 show histograms by plotting the phase of a phase signal expressed as a sin θ value along the X-axis and the appearance frequency of a phase signal corresponding to each phase along the Y-axis. The relationship between the phase and the appearance frequency of a phase signal can be seen.

As is apparent from the comparison of FIGS. 7 and 8, the histogram collection result shown in FIG. 8 is shifted rightward by Y1 as compared to the histogram collection result shown in FIG. 7 because the offset Y1 is added to the center voltage. As a result, to correct the offset Y1, processing (sin θ−Y1), that is, processing of subtracting the offset from sin θ (θ is an angle) along the X-axis of the histogram collection result is applied to the histogram collection result, thereby correcting the offset of the center voltage.

Figure 9:
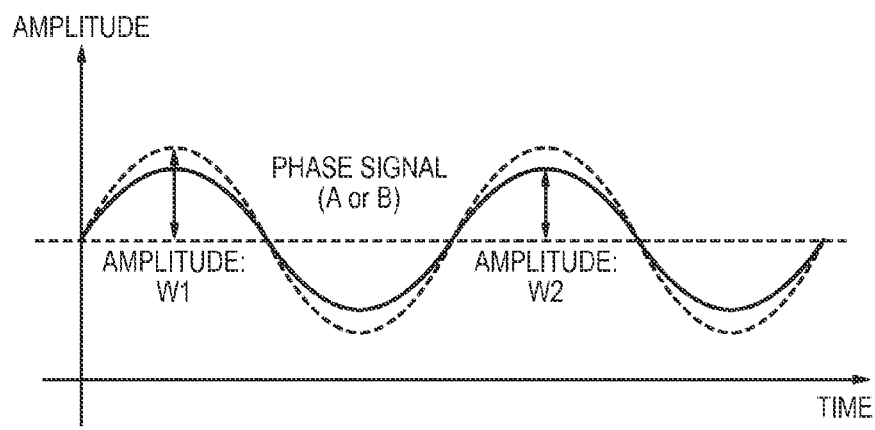
FIG. 9 is a timing chart showing a waveform in a case where the amplitude of a phase signal input from the analog encoder is smaller than a normal amplitude.
Figure 10:
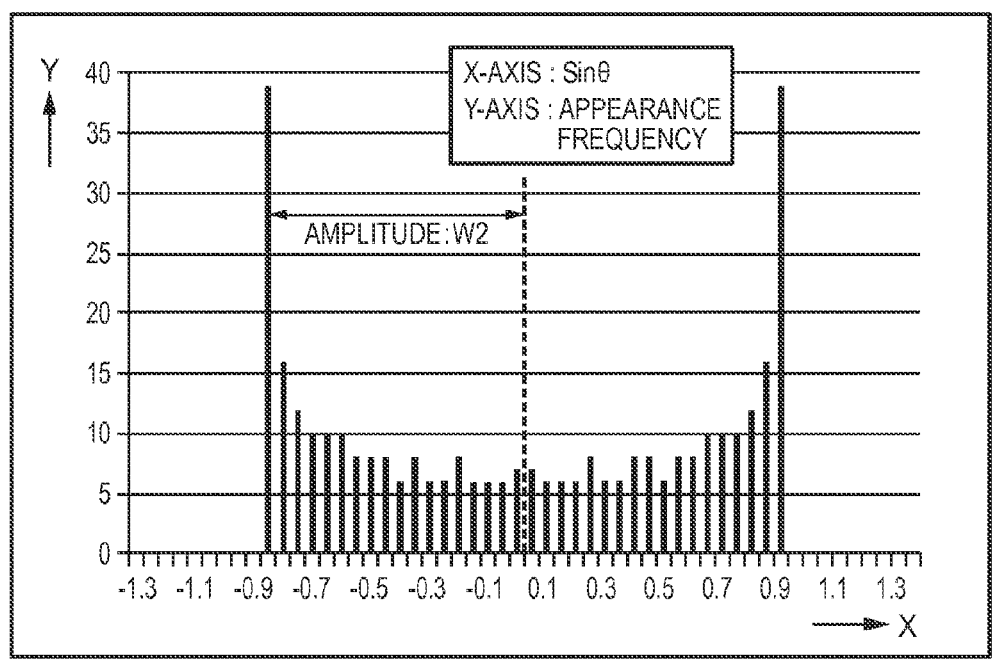
FIG. 10 is a view showing a result of capturing the input waveform shown in FIG. 9 by a histogram format.

FIG. 9 is a timing chart showing a waveform in a case where the amplitude of a phase signal input from the analog encoder is smaller than a normal amplitude. FIG. 10 is a view showing a result of capturing the input waveform shown in FIG. 9 by a histogram format.

Let W1 be a normal amplitude, and W2 be a small amplitude of a waveform. W2 needs to be amplified to meet W1=W2. In this case, let A be an amplification rate. The amplification rate A is decided so as to meet A×W2=W1. The result of capturing by the histogram format is multiplied by the amplification rate A, thereby executing correction. Note that in a case where W1<W2, the value A is multiplied as an attenuation rate.

Based upon this, when the encoder correction circuit 30 executes amplitude correction as well as center voltage offset correction, an ideal phase signal after correction of the encoder phase signal can be passed to the encoder position detection circuit 29.

An actual printing apparatus executes the following operation for the above-described two operation modes. First, using the phase signal collection mode, the phase signal from the analog encoder sensor 11 is analyzed, and correction parameters such as the offset value of the center voltage and the amplification rate of the amplitude to be given to the encoder correction circuit 30 are set. After that, the printing apparatus operates in the normal mode to perform printing on a printing medium. The CPU 19 can perform conveyance control in a condition where the correction parameters corrected upon executing the phase signal collection mode are already set. This makes it possible to not only accurately control the position of the printing medium with few errors but also obviate the necessity of providing a dedicated circuit or memory used to perform correction.

FIG. 11 is a flowchart showing the correction operation of the analog encoder executed by the CPU.

In step S10, it is determined whether or not to execute correction of the analog encoder. In this embodiment, whether or not to execute correction of the analog encoder is determined in consideration of aging. For example, the date/time of product shipment (or apparatus manufacturing) is stored in the ROM 21, and the date/time of previous correction is stored in a non-volatile memory. An elapsed time (TL) can be known by comparing one of the pieces of date/time information with the current time by a clock. The elapsed time is compared with a predetermined threshold (TH1), thereby determining whether or not to execute correction of the analog encoder.

If TL≥TH1, the process advances to step S15. If TL<TH1, the process advances to step S60.

In step S15, it is checked whether or not correction of the analog encoder has been executed previously. This can be known by providing a register bit in the non-volatile memory of the controller and checking on/off of the bit. If the bit is on (representing that correction has been executed previously), the process advances to step S20. If the bit is off (representing that correction has not been executed previously), the process advances to step S60.

In step S20, the connection state of the switch-over circuit 33 is switched over to the phase signal collection mode. More specifically, the output of the first analog/digital converter 34 is connected to the density information holding control circuit 31 by the switch-over circuit 33, whereas the output of the second analog/digital converter 35 is disconnected, as shown in FIG. 4. In step S25, input of the analog encoder phase signal to the density information holding control circuit 31 starts. In step S30, the density information holding control circuit 31 holds the analog encoder phase signal in the RAM 32 as phase information with a histogram format. Hence, information as shown in FIG. 7 or 8 is held in the RAM 32 at this point of time.

In step S35, the CPU 19 reads out the phase information from the RAM 32 via the density information holding control circuit 31 and analyzes it. In step S40, it is determined as the result of analysis whether or not to execute offset correction for a center voltage representing the central value of the amplitude of the phase signal obtained from the analog encoder sensor (first determination). For example, as shown in FIG. 8, if the shift of the center voltage is large as compared to FIG. 7, offset correction is executed.

More specifically, the sin θ value (θref) of the phase corresponding to the center voltage adjusted at the time of apparatus shipment or previous offset correction is compared with the sin θ value (θmea) of the center voltage obtained this time (first comparison), thereby determining whether or not to execute offset correction. Here, it is checked whether or not the absolute value of the difference (phase difference) (θref−θmea) is equal to or larger than a predetermined threshold (TH2: first threshold). If |θref−θmea|≥TH2, correction is executed. If |θref−θmea|<TH2, correction is not executed. Upon determining to execute offset correction, the process advances to step S45. Upon determining not to execute offset correction, the process advances to step S50.

In step S45, the phase difference is set in the encoder correction circuit 30 as an offset correction value. This is equivalent to, for example, comparing the histograms shown in FIGS. 7 and 8 and setting the thus obtained offset Y1.

In step S50, it is determined whether or not to execute amplitude correction (second determination). For example, as shown in FIG. 10, if the amplitude from the sin θ value representing the center voltage is different from that shown in FIG. 7, that is, if the amplitude from the sine value representing the center voltage is smaller than in FIG. 7, or the amplitude from the sine value representing the center voltage is larger than in FIG. 7, amplitude correction is executed.

An amplitude (W1: normal value) adjusted at the time of apparatus shipment or previous amplitude correction is compared with the amplitude (W2) obtained this time (second comparison), thereby determining whether or not to execute amplitude correction. Here, the absolute value of the amplitude difference |W1−W2| is compared with a predetermined threshold (TH3: second threshold). If |W1−W2|>TH3, it is determined to execute amplitude correction. If |W1−W2|≤TH3, it is determined not to execute amplitude correction. Upon determining to execute amplitude correction, the process advances to step S55. Upon determining not to execute amplitude correction, the process advances to step S60.

In step S55, to multiply the amplitude W2 by the amplification rate (or attenuation rate) A to amplify (or attenuate) W2 so as to meet W1=w2, the amplification rate (attenuation rate) A is set in the encoder correction circuit 30.

Finally in step S60, the connection state of the switch-over circuit 33 is switched over to the normal mode. More specifically, the switch-over circuit 33 is returned to the connection state in which the output signal from the first analog/digital converter 34 is input to the encoder correction circuit 30, and the output signal from the second analog/digital converter 35 is input to the density information holding control circuit 31, as shown in FIG. 3. After that, the operation mode of the printing apparatus changes to the normal mode.

As described above, in the phase signal collection mode, the switch-over circuit switches over the connection state so that the density information holding control circuit having a histogram collection function captures the phase signal from the analog encoder sensor. The offset of the center voltage and the variation state of the amplitude/phase difference are analyzed based on the captured histogram state, and correction is performed. For this reason, the phase signal from the analog encoder sensor can be corrected without the necessity of a special capturing circuit configured to detect the phase signal from the analog encoder sensor or a dedicated memory that temporarily stores the phase signal from the analog encoder for analysis of the phase signal. It is therefore possible to suppress an increase in the cost of the entire printing apparatus.

Hence, according to the above-described embodiment, correction of the analog encoder is performed not only at the time of installation of the printing apparatus main body but also by periodically executing processing according to the illustrated flowchart, thereby preventing the printing medium conveyance accuracy from lowering due to aging.

Note that in the above-described embodiment, the density information holding control circuit that holds the density information from the density detection sensor to be used for calibration processing and its memory are used as a circuit configured to hold phase information based on a phase signal from the encoder sensor and create a histogram. That is, the memory and the density information holding control circuit serve as an information holding unit. However, the present invention is not limited to this. For example, another circuit may be used if it is used for processing other than encoder correction and for processing not overlapping encoder processing, and is also usable to render digital information as a histogram and store it.

In the above-described embodiment, in a case where correction of the analog encoder has been executed previously, no correction value is decided. However, even though correction of the analog encoder has been executed previously, if a predetermined time has elapsed (more than a threshold), correction may be executed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-078095, filed Apr. 3, 2013, which is hereby incorporated by reference herein in its entirety.

What is claimed is:

1. An apparatus comprising:
a first acquisition unit configured to acquire information of an operation of a conveyance unit configured to convey a printing medium;
a second acquisition unit configured to acquire information of a density of an image printed by a printhead;
a correction circuit configured to correct the information of the operation acquired by the first acquisition unit;
a control circuit configured to collect information of input data and control to hold the information of the input data with a predetermined format in a memory;
a switching circuit configured to switchably connect the control circuit to at least either the first acquisition unit or the second acquisition unit; and
a setting circuit configured to set a correction value to the correction circuit,
wherein the control circuit corrects the information of the density of the image acquired by the second acquisition unit and controls to hold the information of the density of the image with the predetermined format in the memory,
wherein the control circuit corrects the information of the operation acquired by the first acquisition unit and controls to hold the information of the density of the image with the predetermined format in the memory,
the setting circuit determines a correction value of the information of the operation, based on the information of the operation with the predetermined format held in the memory, and
the correction circuit performs correction based on the correction value set by the setting circuit if the control circuit is connected to the first acquisition unit.

2. The apparatus according to claim 1, wherein there are provided a first mode which is a mode for determining the correction value of the information of the operation acquired by the first acquisition unit, and a second mode which is a mode for causing the conveyance unit to convey the printing medium based on the correction value determined in the first mode.

3. The apparatus according to claim 1, further comprising a specify unit configured to specify a position of the printing medium conveyed by the conveyance unit,
wherein the information of the operation corrected by the correction circuit is input to the specify unit.

4. The apparatus according to claim 1, wherein
the first acquisition unit comprises a first detection unit configured to detect the operation of the conveyance unit, and
the second acquisition unit comprises a second detection unit configured to detect the information of the density of the image printed by the printhead.

5. The apparatus according to claim 4, further comprising a connecting unit configured to connect the control circuit to the first detection unit in a case where the control circuit is used for determining the correction value of the information of the operation acquired by the first acquisition unit, and connect the control circuit to the second detection unit in a case where the control circuit is used for specifying the density of the image.

6. The apparatus according to claim 1, wherein
the first acquisition unit acquires, as the information of the operation, a phase signal output from an encoder sensor provided in the conveyance unit, and
the apparatus further comprises an analog/digital converter configured to analog/digital-convert the phase signal.

7. The apparatus according to claim 1, wherein
the second acquisition unit acquires, as the information of the density, a density signal output from a density detection sensor configured to detect the density of the image printed by the printhead, and
the apparatus further comprises an analog/digital converter configured to analog/digital-convert the density signal.

8. The apparatus according to claim 1, wherein
the first acquisition unit acquires, as the information of the operation, a phase signal output from an encoder sensor provided in the conveyance unit, and
the control circuit determines an offset value used to correct a shift of a center voltage representing a center of an amplitude of the phase signal from a set value and/or the correction value of an amplitude of the phase signal.

9. The apparatus according to claim 8, further comprising:
a first determination unit configured to determine to perform offset correction by the correction unit in a case where a phase difference between a phase corresponding to the center voltage representing the center of the amplitude of the phase signal acquired by the first acquisition unit and the phase corresponding to the center voltage representing the center of the amplitude of the phase signal held in the memory is larger than a predetermined first threshold, and
the control circuit determines the phase difference as the correction value of an offset correction.

10. The apparatus according to claim 8, further comprising:
a second determination unit configured to determine to perform amplitude correction by the correction circuit in a case where an amplitude difference between the amplitude of the phase signal acquired by the first acquisition unit and the amplitude of the phase signal held in the memory is larger than a predetermined second threshold, and
the control circuit determines the amplitude of the phase signal using a value of a ratio of the amplitude of the phase signal acquired by the first acquisition unit and the amplitude of the phase signal held in the memory as one of an amplification rate and an attenuation rate.

11. The apparatus according to claim 1, further comprising the memory.

12. The apparatus according to claim 1, further comprising the conveyance unit.

13. The apparatus according to claim 1, further comprising the printhead.

14. The apparatus according to claim 1, wherein
the control circuit collects the information of the input data by creating a histogram of the input data;
the control circuit creates a histogram of the density of the image, based on the information of the density of the image acquired by the second acquisition unit, and controls to hold the information of the density of the image by a histogram format in the memory,
the control circuit creates a histogram of the operation, based on the information of the operation acquired by the first acquisition unit, and controls to hold the information of the operation by a histogram format in the memory, and
the setting circuit determines the correction value of the information of the operation, based on the created histogram of the operation held in the memory.

15. The apparatus according to claim 14, further comprising an analysis unit configured to analyze the histogram created by the control circuit,
wherein the setting unit determines the correction value of the information of the operation, based on a result of analyzed by the analysis unit.

16. The apparatus according to claim 1, wherein the information of the operation is information of an operation position of the conveyance unit.

17. A method of an apparatus including a first acquisition unit configured to acquire information of an operation of a conveyance unit configured to convey a printing medium, a second acquisition unit configured to acquire information of a density of an image printed by a printhead, a correction circuit configured to correct the information of the operation acquired by the first acquisition unit, a control circuit configured to collect information of input data and control to hold the information of the input data with a predetermined format in a memory, a switching circuit configured to switchably connect the control circuit to at least either the first acquisition unit or the second acquisition unit and a setting circuit configured to set a correction value to the correction circuit, the method comprising:
correcting information of the operation acquired by the first acquisition unit and holding the information of the operation with the predetermined format in the memory, at the control circuit;
correcting information of the density of the image acquired by the second acquisition unit and holding the information of the density of the image with the predetermined format in the memory, at the control circuit;
determining a correction value of the information of the operation, based on the information of the operation with the predetermined format held in the memory, at the setting circuit; and
performing correction based on the correction value at the correction circuit if the control circuit is connected to the first acquisition unit.

18. A non-transitory computer-readable storage medium storing a program that causes a computer to function as an apparatus including a first acquisition unit configured to acquire information of an operation of a conveyance unit configured to convey a printing medium, a second acquisition unit configured to acquire information of a density of an image printed by a printhead, a correction circuit configured to correct the information of the operation acquired by the first acquisition unit, a control circuit configured to collect information of input data and control to hold the information of the input data with a predetermined format in a memory, a switching circuit configured to switchably connect the control circuit to at least either the first acquisition unit or the second acquisition unit and a setting circuit configured to set a correction value to the correction circuit, the program comprising:
correcting information of the operation acquired by the first acquisition unit;
holding the information of the operation with a predetermined format in the memory;
correcting information of the density of the image acquired by the second acquisition unit;
holding the information of the density of the image with the predetermined format in the memory;
determining a correction value of the information of the operation, based on the information of the operation with a predetermined format held in the memory; and
performing correction based on the correction value if the control circuit is connected to the first acquisition unit.

* * * * *